United States Patent [19]

Paul, Jr.

[11] 4,403,626

[45] Sep. 13, 1983

[54] VALVE ASSEMBLY

[75] Inventor: Herman L. Paul, Jr., Lebanon, Pa.

[73] Assignee: Continental Disc Corporation, Kansas City, Mo.

[21] Appl. No.: 264,355

[22] Filed: May 18, 1981

[51] Int. Cl.³ ............................................. F16K 13/04
[52] U.S. Cl. .................................. 137/68 R; 137/119; 137/454.2; 137/557; 137/625.13; 137/625.15; 137/625.47; 137/613; 137/876; 137/887
[58] Field of Search .......... 137/68 R, 625.13, 625.12, 137/625.15, 625.16, 876, 887, 625.47, 613, 119, 12, 597, 454.2, 454.6, 454.7

[56] References Cited

U.S. PATENT DOCUMENTS

| 1,390,662 | 9/1921 | Wittig | 137/625.47 X |
|---|---|---|---|
| 1,498,477 | 6/1924 | Nichles | 137/613 X |
| 2,252,134 | 8/1941 | Mueller | 137/625.16 |
| 2,623,724 | 12/1952 | Downey | 137/625.47 |
| 2,661,926 | 12/1953 | Resek | 137/625.47 |
| 3,199,537 | 8/1965 | Swanson | 137/625.47 X |
| 3,431,933 | 3/1969 | Tidd | 137/119 |
| 3,630,231 | 12/1971 | Miller | 137/625.16 |
| 3,770,918 | 11/1973 | Fortmann | 137/68 R X |
| 4,085,764 | 4/1978 | Raidl | 137/613 X |
| 4,223,700 | 9/1980 | Jones | 137/876 X |
| 4,342,988 | 8/1982 | Thompson | 137/68 R X |

Primary Examiner—Harold W. Weakley
Attorney, Agent, or Firm—Litman, Day & McMahon

[57] ABSTRACT

A low restriction multiple outlet valve includes a housing having an interior chamber with an inlet opening thereinto, at least two outlets, and a flow directing member. The flow directing member snugly rotates about a portion of the chamber on an axis. The flow directing member also includes at least one aperture therethrough which is spaced from the axis and which is selectively positionable so as to allow flow communication between the inlet and a selected outlet. Preferably, the flow directing member is hemispherical in shape and includes two apertures spaced 90 degrees to each other relative to the axis and the housing includes a pair of outlets spaced 180 degrees from each other relative to the axis. In addition, the valve is normally utilized in conjunction with at least one pressure relief mechanism such as a rupture disc associated with one of the outlets thereof. The valve is normally positioned so as to flow communicate the inlet thereof with the relief device. The flow directing member is manually or automatically rotatable when pressure has damaged the relief device to flow communicate the inlet with the other outlet so as to allow repair of the damaged device. In another embodiment, the valve may have a plurality of outlets while the flow directing member may have one or more apertures so as to allow flow from an inlet to any of many outlets or alternatively, flow from several inlets to respective outlets.

15 Claims, 10 Drawing Figures

Fig. 3.

VALVE ASSEMBLY

BACKGROUND OF THE INVENTION

The present invention relates to a multiple outlet valve and in particular, a valve having a very low flow resistance therethrough, especially such a valve in conjunction with pressure relief systems.

In the chemical industry, overpressure relief systems are a requirement of almost every pressurized line, tank or other vessel. The most common types of relief devices are rupture discs and relief valves. Rupture discs present an inherent problem in that once they rupture, the disc must be replaced in order for the relief device to occlude the vent line associated therewith. Therefore, the ruptured disc must be removed and replaced with a new disc. Where the material in the line or tank is toxic or otherwise hazardous, the line or tank must often be completely emptied and purged before the rupture disc may be replaced. In addition, if the material in the line or tank is volatile in nature, a substantial amount of the material may escape into the vent system before the rupture disc can be replaced.

Relief valves somewhat overcome the problem associated with ruptures discs in that valves are biased to close and thereby occlude the vent line after the pressure in the system returns to an acceptable level. However, relief valves are relatively expensive compared to rupture discs. In addition, relief valves require a great deal of maintenance in order to insure their workability and therefore must frequently be removed from the process and tested. Such removal again requires that volatile or hazardous materials be removed from process tanks and lines protected by the relief valve before the valve can be removed.

It is therefore desirable that multiple relief devices may be provided for a common vent such that the vent may be normally in flow communication with a first of such devices and, should the first device need repair and/or maintenance, be able to switch to a second device while isolating the first such device from the system. In switching from one relief device to another it is extremely important to ensure that the process under pressure is at all times protected by at least one of the relief devices. Therefore, according to the present invention, a valving mechanism is provided for use with multiple relief devices to insure that the pressurized system to be protected is always in direct flow communication with at least one of the relief devices, while allowing a selected one of the relief devices to be isolated from the pressurized system to be repaired and/or maintained.

It is further desirable to have a valve of the type described which has a relatively small flow restriction associated therewith as pressurized fluid passes therethrough. A relatively low flow restriction allows inlet piping, outlet piping, and the valve itself to be of a smaller size than compared to valves having a larger flow restriction associated therewith. It is further desirable that the valve be easy to maintain and dismantle should maintenance be necessary thereupon.

In operation of a valve in conjunction with a rupturable relief device such as a rupture disc, it is also desired that the valve should communicate the pressurized fluid in the line or tank to the unruptured relief device as soon as the pressure within the process returns to a non-overpressure state and stabilizes. In this manner, excess material from the process is not lost through the ruptured relief device beyond what is necessary to return the process to a non-overpressure state. Therefore, an automated control system has been provided by the present invention to automatically actuate the valve to communicate the process with an unruptured relief device. The control mechanism can also be manually overridden or may operate to partially swing the valve to the unruptured relief device so as to continue to vent some of the material and thereby relieve pressure but not to vent more than is necessary to reduce the pressure to an acceptable level.

In a modified embodiment of the present invention, the valve mechanism may provide a simple device for switching an inlet flow to a plurality of individual outlet conduits. This is accomplished with a valve mechanism which is relatively low in flow restriction and yet simple to operate. A further modification of the valving mechanism provides for a simple mechanism for switching multiple pairs of interconnecting lines, such as what is commonly known as a four-way valve, with little flow restriction.

OBJECTS OF THE INVENTION

Therefore, the objects of the present invention are: to provide a multiple outlet valve mechanism having low flow resistance therethrough; to provide such a valve mechanism in combination with at least two overpressure relief devices such that a process to be protected from overpressure is always in flow communication with at least one of the relief devices and such that a selected one of the relief devices may be isolated from the process for repair or maintenance; to provide such a mechanism comprising a housing with an interior chamber and a rotatable hemispherical member snugly received within the chamber; to provide such a mechanism wherein the housing includes multiple outlet ports and the rotatable member includes apertures which may be selectively aligned with the outlet ports to allow flow communication between an inlet of the housing and the outlet ports; to provide such a mechanism wherein each of the outlet ports and the passageways communicating therewith have a cross-sectional area at least as great as the inlet port of the housing; to provide such a mechanism wherein the rotatable member rotates about an axis and there are a pair of outlet ports separated by 180 degrees relative to the axis and a pair of apertures through the rotatable member separated by 90 degrees relative to the axis such that one of the apertures is always in flow communication with one of the outlet ports and such that when one of the apertures is in full alignment with one of the outlet ports the other aperture is not in alignment with the other outlet port; to provide such a mechanism including a control apparatus for automatically switching between relief devices; to provide such a mechanism which is relatively simple to maintain; to provide a modified valving mechanism which provides selective flow communication between an inlet port and a plurality of outlet ports; to provide a further modified valving mechanism which allows selective flow communication between pairings of ports; to provide such valving mechanisms which are relatively inexpensive to build, which are relatively simple in design, and which are especially well suited for the intended purpose thereof.

Other objects and advantages of this invention will become apparent from the following description taken in connection with the accompanying drawings wherein are set forth, by way of illustration and example, certain embodiments of this invention.

SUMMARY OF THE INVENTION

A valve mechanism is provided comprising a housing and a flow directing member. The housing includes an interior chamber with a portion having a surface which is defined by rotation of a shape about an axis and which is generally symmetrical in design. Preferably, the surface is described as hemispherical or circular. The flow directing member rotates about the axis and has an external surface which fits snugly and rotatably within the symmetrical chamber surface. The housing includes an inlet port and preferably, two outlet ports. Each outlet port opens into the symmetrical portion of the chamber. Each of the ports are spaced from each other and are preferably equal in size and equally spaced from the axis which is positioned intermediate the ports. The flow directing member includes aperture means therethrough. The aperture means provides selective flow communication between the inlet port and one or more of the outlet ports.

Preferably, the aperture means comprises a pair of apertures or passageways through the flow directing member. Also, preferably, each of the passageways is equal in size both to each other and to the outlet ports and are equally spaced from the axis so as to be totally alignable with at least one of the outlet ports. In a particular embodiment, the outlet ports are spaced 180 degrees from each other relative to the axis and the passageways are spaced 90 degrees from each other relative to the axis. In this manner, when the flow directing member is positioned in a first position such that one of the passageways aligns fully with one of the outlet ports, then the other passageway is totally occluded and does not align with the other outlet port. Also in this manner, when one of the passageways is only partially aligned with one of the outlet ports the other passageway is also partially aligned with the other outlet port. Preferably, at all times the sum of the cross-sectional areas of the passageways aligned with the outlet ports is at least equal to the smallest outlet port. Also preferably, the passageways and the outlet ports are each at least as large as the inlet port and the axis is generally coaxial with the inlet port such that a point on the flow directing member tends to rotate in a plane perpendicular to the inlet port.

A valve stem is axially attached to and extends axially and outwardly from the flow directing member through the housing. The valve stem allows selective rotation of the flow directing member relative to the housing.

Sealing means is utilized to prevent leakage between the flow directing member and the housing into an outlet port which is being occluded by the flow directing member. The sealing means includes a ring slidably mounted in and encircling each outlet port. The ring includes a seal on the face thereof engaging and facing the flow directing member. The ring also includes sealing means, such as an O-ring between the ring and the outlet port. A passageway allows fluid under pressure which has seeped around the flow directing member to engage a face of the ring opposite the seal and thereby urge the ring with the seal thereon against the flow directing member and thereby seal an occluded port from the fluid within the housing.

The overpressure relief devices may comprise any type of relief device suitable for utilization in conjunction with a relief vent. Especially suited for this purpose are rupture discs and relief valves, although other devices such as surge tanks are readily foreseen as being usable for this purpose. It is preferred that the outlet port of the valve mechanism which is normally in flow communication with the inlet port have a rupture disc associated therewith as the relief device. A suitable relief rupture disc, as shown in the drawings, is described in applicant's copending application for United States Patent entitled REPLACEABLE RUPTURE DISC CARTRIDGE ARRANGEMENT to which reference is hereby made. The relief device associated with the outlet port which is switched to under abnormal conditions or when the normal relief device is under repair may also be a rupture disc or alternatively, may be a relief valve or other suitable relief device.

A control mechanism may be provided to automatically control the valve mechanism to switch from one relief device, normally when the first relief device has been damaged by rupture through overpressure of the system. Such a control mechanism may comprise a sensor for detecting rupture of the relief device and emitting a signal that the relief device has ruptured, computer means for receiving the signal, and a rotating mechanism controlled by the computer means and rotating the flow directing member such that the inlet port of the housing is switched from flow communication with a first relief device to a second relief device. In addition, after switching to a second relief device, the first relief device is occluded from pressurized fluid in the process.

The sensor may be a device for sensing pressure downstream of the relief device or detecting actual failure of the relief device such as a strain gauge type of device attached to a rupture disc. In addition, another sensing device may be utilized to determine the pressure within the process and determine when the pressure of the fluid within the process has fallen below an overpressure level so that the computer means may thereafter signal the rotating mechanism to actuate switching of the valve. It is foreseen that in processes where large swings or fluctuations within the pressure thereof are likely to occur, that a sophisticated computer analysis may be made to determine the liklihood of one of the swings being above the pressure limit requiring relief and in this manner determine whether or not to maintain the flow directing member of the valve mechanism in a position so as to direct the fluid pressure to the already ruptured relief device rather than the unruptured relief device. It is also foreseen that a computer means could be utilized to partially rotate the flow directing member such that passageways therethrough are partially open to both ports simultaneously so as to relieve only that amount of material through the ruptured relief device which is necessary to bring the pressure within the process to an acceptable range.

In a modified form of the present invention, a valve mechanism similar to that described above is provided. However, this valve mechanism may have two, three or more outlet ports, whereas the flow directing member requires at least one passageway therethrough. Again the outlet ports and passageway are spaced from the axis such that the passageway is rotatable so that the passageway may be aligned with each of the outlets.

Alternatively, the flow directing member may have two passageways and the housing has at least two ports which may be aligned to communicate with the flow directing member passageways. In this embodiment one of the ports functions as an inlet port while the other ports function as outlet ports such that upon rotation of the flow directing member, different combinations of inlet and outlet ports may be combined in a flow communicating pattern.

In yet another modified embodiment of the present invention, the flow directing member comprises a hemispherical shell which has an enclosed base and which is further divided into two quadrants by a separating wall passing through and parallel to the axis of rotation thereof. In this embodiment four ports are provided in the housing and four passageways are provided within the flow directing member which are each simultaneously alignable with a respective one of the outlet ports. In this manner, pairs of the outlet ports are placed in flow communication with each other. Upon rotation of the flow directing member different pairs of the ports are placed in flow communication with one another, whereby the valve mechanism functions as a four-way switching device.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
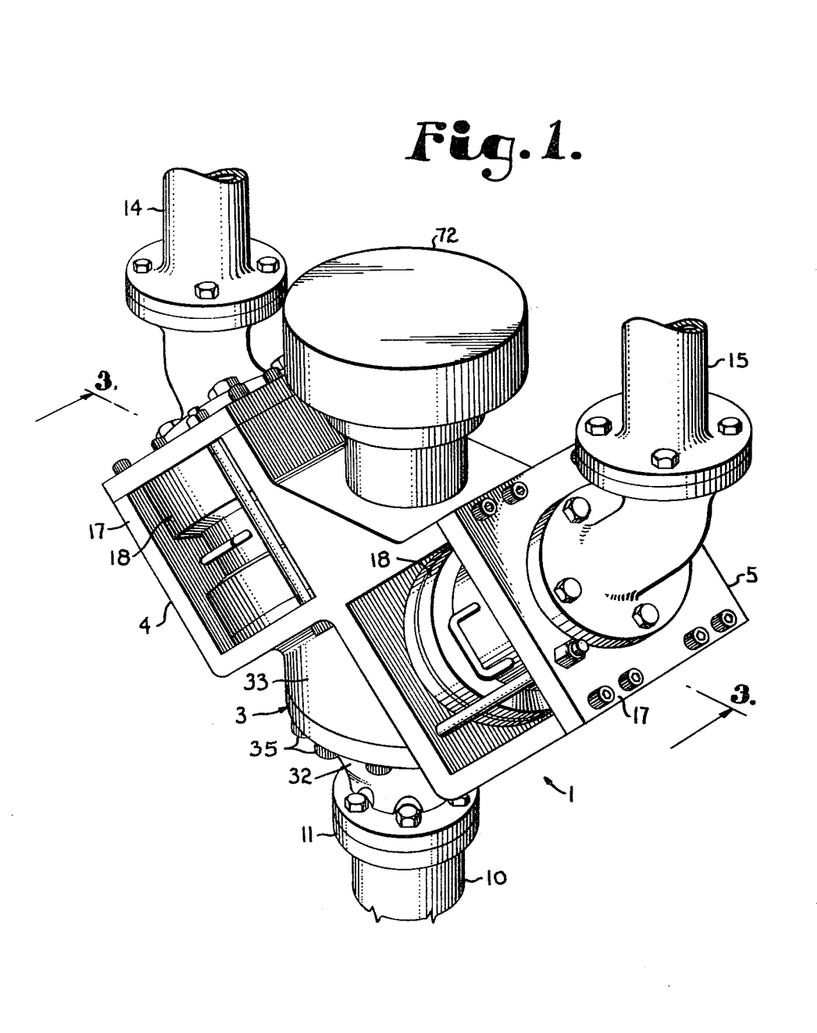
FIG. 1 is a perspective view of an overpressure relief assembly comprising a valve mechanism in combination with a pair of pressure relief devices.
Figure 2:
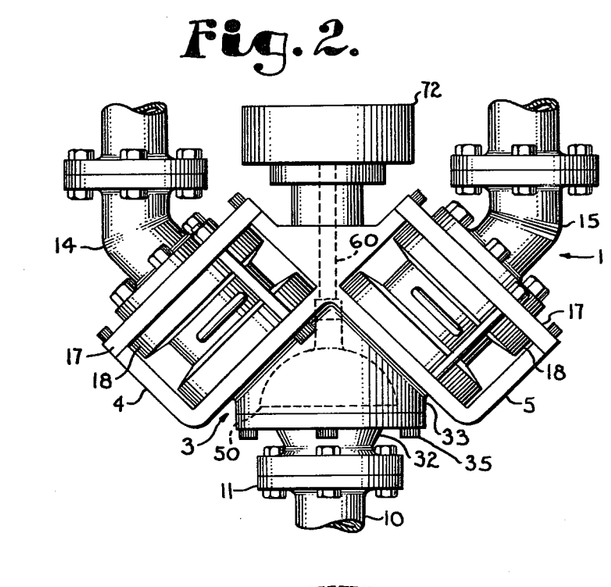
FIG. 2 is a reduced scale side elevational view of the assembly showing a portion of the valve mechanism in phantom.

The reference numeral 1 generally designates an overpressure relief assembly according to the present invention. The assembly 1 includes a valve mechanism 3, a first relief device 4 and a second relief device 5. As seen in FIG. 1, the valve mechanism 3 is attached to a vent pipe 10 by suitable flanges 11. The vent pipe 10 provides direct flow communication for fluid from a process (not shown) to an inlet 12 of the valve mechanism 3.

The relief devices 4 and 5 communicate with relief vents 14 and 15, when in a relief state thereof, that is, relieving material under pressure therethrough, although normally same occlude flow through vents 14 and 15 respectively when in a nonrelief state thereof. The particular relief devices 4 and 5 illustrated herein are described in greater detail in applicant's copending application for United States Patent, entitled REPLACEABLE RUPTURE DISC CARTRIDGE ARRANGEMENT. However, for sake of convenience, the relief devices 4 and 5 which are essentially equivalent are described as follows. Each of the relief devices 4 and 5 comprise a receptacle 17 and a cartridge 18 which slidably fits within the receptacle 17 and is held therein by a locking pin 20. Each cartridge 18 includes an internal bore 19 which each communicate with respective vent pipes 14 and 15. Each internal bore 19 is normally intermediately occluded by a rupture disc 21 to prevent flow therethrough to the vent pipes 14 and 15 respectively. A locking mechanism 23 secures the rupture disc 21 within the cartridge 18 and sealing rings 24 and 25 prevent leakage of fluids past the cartridge 18 into the ambient atmosphere. While particular relief devices 4 and 5 have been illustrated, a conventional rupture disc assembly, relief valve, or the like could be utilized for the same purpose.

Figure 3:
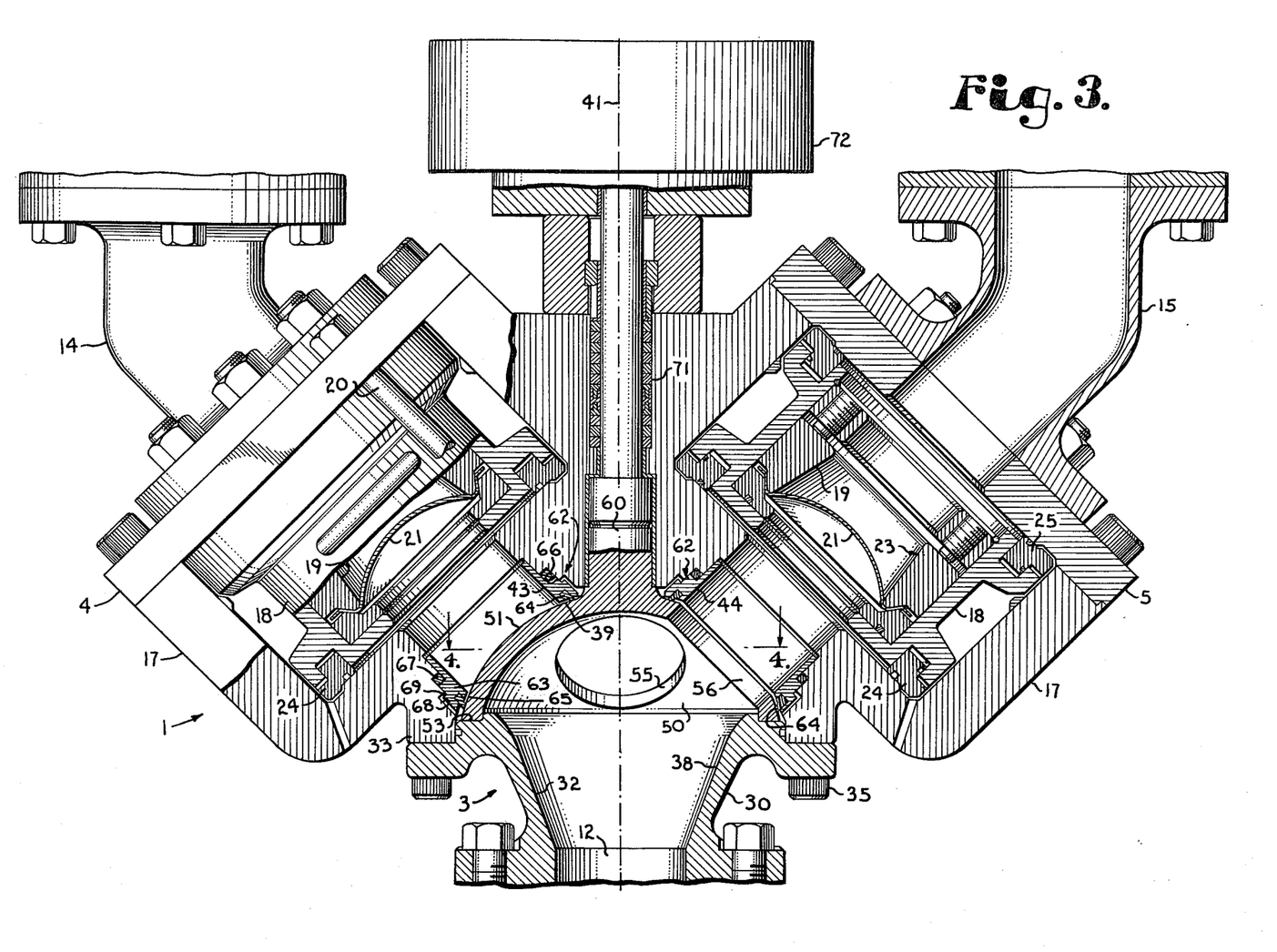
FIG. 3 is an enlarged cross-sectional view of the assembly taken along line 3—3 of FIG. 1.

The valve mechanism 3 comprises a housing 30 having the inlet port 12 located therein. As seen in FIG. 3, the housing 30 includes a lower portion 32 and an upper portion 33. The upper portion 33 is joined with the lower portion 32 by suitable bolts 35 or the like. A chamber 38 is formed within the housing 30. An inner surface 39 of the housing upper portion 33 is defined by rotation of a shape about an axis 41 which is generally symmetrical and smoothly curved. In the illustrated particular embodiment shown in FIG. 3, the surface 39 is generally hemispherical in shape except for openings therethrough which will be discussed herein below.

A first port 43 and a second port 44 pass through the housing upper portion 33 and open onto the surface 39 so as to communicate the chamber 38 with central bore 19 of the relief devices 4 and 5 respectively. The ports 43 and 44 are located on oppposite sides of the housing upper portion 33 and are generally spaced 180 degrees from one another with respect to the axis 41. The ports 43 and 44 are shown as generally equal in diameter and approximately an equal size in cross-sectional area to the housing inlet port 12. Located within the housing upper portion 33 is a flow directing member 50. The flow directing member has an outer surface 51 which is generally coextensive with and snugly rotatable within the housing upper portion inner surface 39. In particular, the flow directing member 50 is rotatable about the axis 41.

The flow directing member 50 slides within a groove 53 formed on an upper surface of the housing lower portion 32. The flow directing member 50 includes aperture means therethrough and in particular, includes first and second apertures or passageways 55 and 56 respectively passing therethrough. The flow directing member 50 is also of a relatively thin thickness thereby forming a hemispherical shell and the passageways 55 and 56 each have an axis which is generally radial relative to the hemispherical shell of the flow directing member 50. Attached to an axially extending from the flow directing member 50 are valve rotation means or stem 60 which extends through the housing 30.

Figure 4:
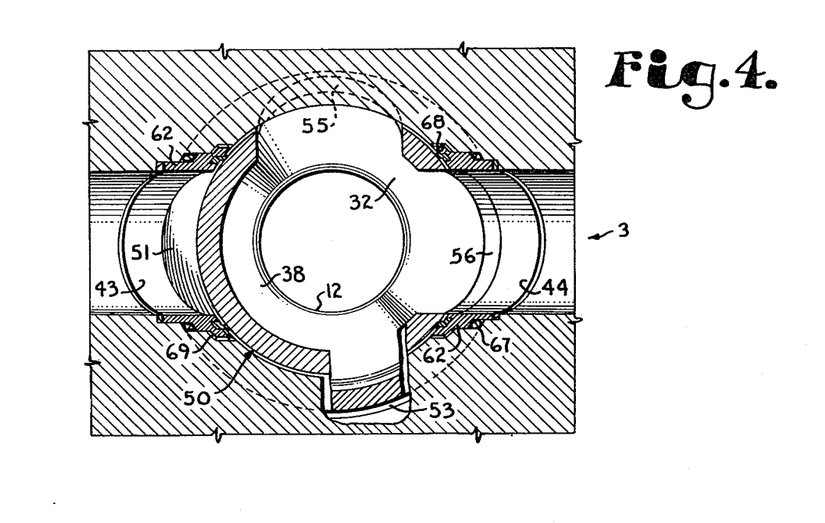
FIG. 4 is an enlarged and fragmentary cross-sectional view of the valve mechanism taken along line 4—4 of FIG. 3 showing a flow directing member in a first position thereof.
Figures 5, 7:
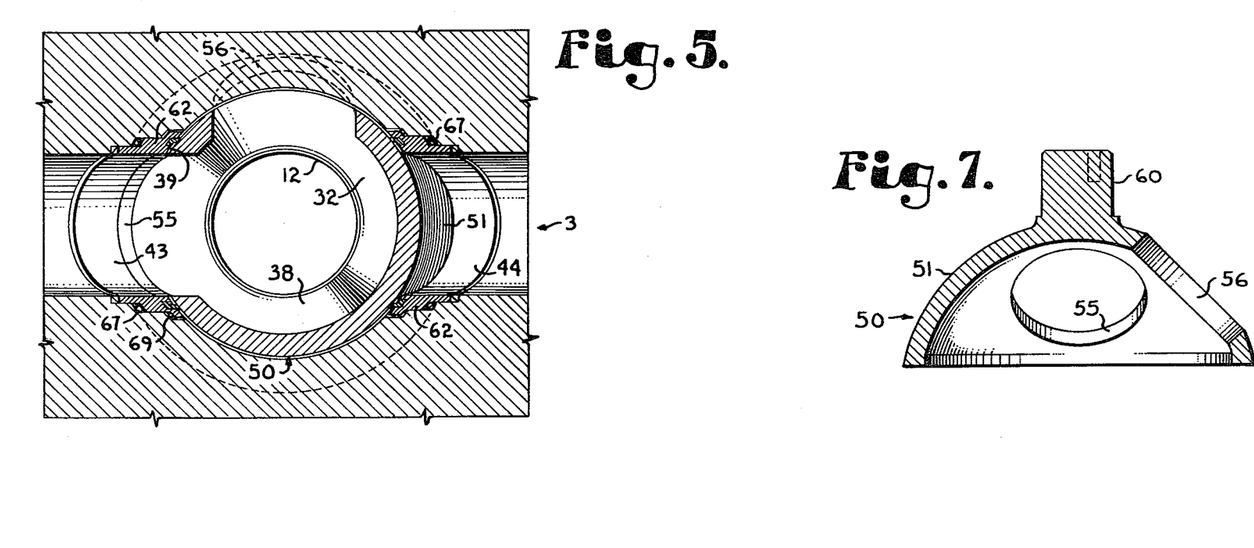
FIG. 5 is a fragmentary and enlarged cross-sectional view of the valve mechanism similar to that shown in FIG. 4 except with the flow directing member in a second position thereof.
FIG. 7 is an enlarged and cross-sectional view of the flow directing member taken along line 7—7 of FIG. 6.
Figure 6:
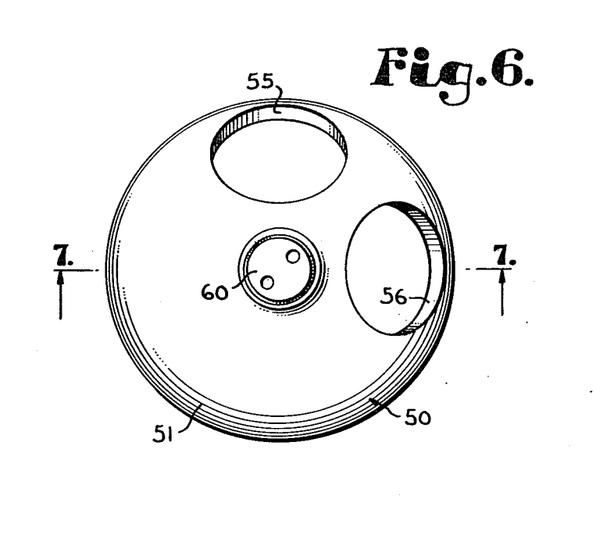
FIG. 6 is an enlarged top plan view of the flow directing member.

The passageways 55 and 56 are generally equally spaced from the axis 41 and are of generally equal size. Also, the passageway 55 and 56 are generally spaced at 90 degrees with respect to the axis 41 and are alignable with the ports 43 and 44 respectively. In addition, the passageways 55 and 56 are generally equal in size and coaxial with the ports 43 and 44 when aligned therewith respectively. It can be seen from FIGS. 3, 4 and 5 that when the port 44 is fully aligned with the passageway 56, that the port 43 is fully occluded by the flow directing member 50. It can also be seen that when the port 43 is aligned with the passageway 55, that the port 44 is fully occluded by the flow directing member 50.

Each of the ports 43 and 44 are provided with sealing means for sealing between the respective port and the flow directing member 50, so as to prevent passage of material between the flow directing member 50 and the housing 30 into the respective port when same is occluded by the flow directing member 50. Such sealing means are illustrated as the sealing members 62 which are essentially equivalent for both ports 43 and 44. In particular, each sealing member 62 includes a sealing ring 63 having a seal 64 on a face 65 thereof which is in engagement with and in facing relationship to the flow directing member 50. The ring 63 is somewhat slidably positioned within a groove 66 surrounding each of the ports 43 and 44. An O-ring 67 seals between the ring 63 and the groove 66. A passageway 68 allows fluid under pressure to flow from between the housing 30 and the flow directing member 50 to a face 69 of the ring 63 opposite the face 65. This fluid under pressure biases the ring 63 toward the flow directing member so as to urge the seal 64 thereagainst and prevent flow of fluid between the housing 30 and the flow directing member 50 into the respective port 43 or 44.

The stem 60 is encircled by a packing gland and suitable sealing material 71 before exiting the housing 30 to prevent leakage of fluid from the chamber 38 to the ambient atmosphere. The stem 60 terminates in control means. Although it is foreseen that the control means could be a hand actuator for manual control of the valve mechanism 3, in the illustrated embodiment the control means is an automated actuator 72.

Figure 10:
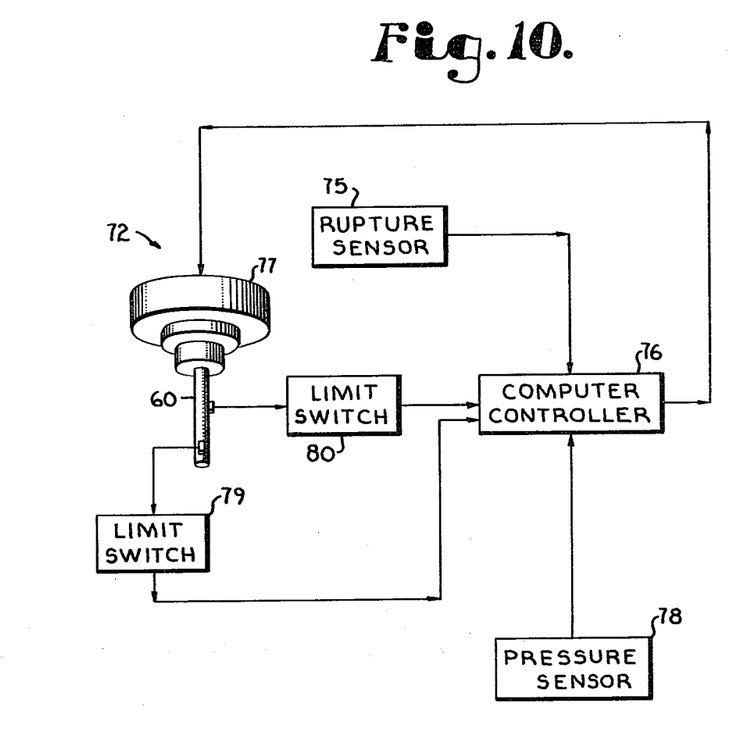
FIG. 10 is a schematic diagram for a control mechanism to actuate the valve mechanism of the assembly of FIG. 1.

The actuator 72 is best illustrated in FIG. 10 and comprises a rupture sensor 75, computer means or a computer controller 76, a pressure sensor 78 and a pair of stop means or limit switches 79 and 80. The rupture sensor 75 senses the failure or rupture of the rupture disc 21 associated with the relief device 5 which is normally placed in flow communication with the housing inlet 12 by suitable placement of the passageway 56 in direct alignment with the port 44. This rupture sensor may be a pressure sensor in the vent 15, a strain guage directly associated with the rupture disc 21 or other suitable device for sensing failure of the rupture disc 21. The rupture sensor 75 sends a signal to the computer controller 76 when the rupture disc 21 associated with the relief device 5 fails. The computer controller 76 will thereafter normally send a signal to a rotating mechanism 77 associated with the shaft 60. The rotating mechanism 77 under control of the computer controller 76 selectively rotates the shaft 60 so as to position the passageways 55 and 56 relative to the ports 43 and 44. In certain applications, a pressure sensor 78 for determining the pressure of the process upstream of the inlet port 12 may be provided to give the computer controller 76 additional information regarding the pressure in the process. If the pressure in the process is above the limit at which the relief devices 4 and 5 relieve, then the computer controller 76 may elect to maintain the position of the flow directing member 50 such that the passageway 56 continues to communicate with the port 44. Alternatively, the computer controller 76 may activate the rotating mechanism 77 to rotate the shaft 60 counterclockwise less than 90 degrees such that the passageways 55 and 56 are both in partial flow communication with the ports 43 and 44 respectively. After the computer controller 76 determines that the pressure in the process is below the level whereat the relief devices 4 and 5 relieve, the shaft 60 may be rotated such that the passageway 55 is fully in alignment with the port 43 and the port 44 is occluded by the flow directing member 50. A pair of stop means or, as illustrated, limit switches 79 and 80 prevent the rotating mechanism 77 from rotating the shaft 60 too far, in this embodiment outside a range of 90 degrees. In particular, at least one of the passageways 55 or 56 should at all times be in at least partial alignment with one of the ports 43 or 44 so as to provide positive relief should the process overpressurize. The stop means or limit switches 79 and 80 prevent the shaft from rotating the passageways 55 and 56 to such an extent that both ports 43 and 44 are completely occluded by the flow directing member 50 and, preferably, at all times the cross-sectional area of the passageways 55 and 56 in alignment with the respective ports 43 and 44 is at least equal to the cross-sectional area of the inlet port 12 and/or the outlet ports 43 and 44.

In use, the assembly 1 is installed on the vent 10 and the flow directing member 50 is normally placed in a first position wherein the passageway 56 aligns with the port 44 so as to provide flow communication from the inlet port 12 through the valve mechanism 3 to the rupture disc 21 of the relief device 5. Once the process overpressurizes and ruptures the rupture disc 21, or whenever it is desired to perform maintenance on the relief device 5, the valve mechanism 3 is actuated manually or through the actuator 72 such that the shaft 60 is caused to rotate 90 degrees whereby the passageway 55 fully aligns with the outlet port 43 at which time the rupture disc 21 of the relief device 4 is in flow communication with the inlet port 12. Also at this time, the relief device 5 is isolated from flow communication with the inlet port 12 by the outlet port 44 being occluded by a solid or nonperforated portion of the flow directing member 50. The seal member 62 surrounding the port 44 prevents leakage of pressurized fluid into the relief device 5 from the chamber 38. At this time the cartridge 18 of the relief device 5 may be withdrawn or removed from the system such that the rupture disc 21 associated therewith may be repaired or replaced and thereafter the actuator 72 may be activated to place the flow directing member 50 in the first or normal position thereof relative to the housing 33.

Figure 8:
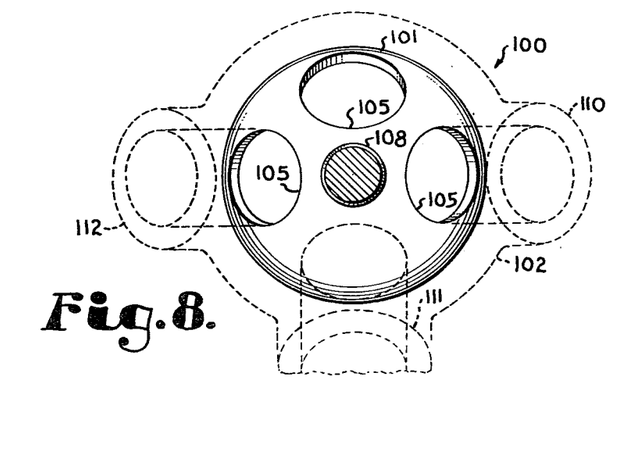
FIG. 8 is a fragmentary top plan view of a modified valve mechanism showing a flow directing member having three ports and a housing associated therewith in phantom.

Illustrated in FIG. 8 is a modified valve mechanism according to the present invention generally designated by the reference numeral 100. The valve mechanism 100 is not necessarily utilized in conjunction with an overpressure relief assembly such as the valve mechanism 3 of the previous embodiment of the present invention.

The valve mechanism 100 comprises a flow directing member 101 which is positioned within a housing 102 shown in phantom. The flow directing member 101 is similar to the flow directing member 50 of the previous embodiment except that the flow directing member 101 includes three passageways 105 which are positioned equally distant from and in 90 degree increments with respect to an axis which is coaxial with a rotating shaft 108. The shaft 108 is attached to and extends outwardly of the housing 102 for control of the flow directing member 101. The housing 102 includes three outlet ports 110, 111 and 112. As the flow directing member 101 is positioned in FIG. 8, the housing outlet ports 110 and 112 are in flow communication with one another. It is possible that one of the ports 110 or 112 may function as an inlet port and the other as an outlet port or, alternatively, both may function as outlet ports and the housing may include an inlet port such as was described in the previous embodiment as inlet port 12. The size, position and shape of the other parts of the valve mechanism 100 are essentially the same as those as were described for the valve mechanism 3.

In use, the valve mechanism 100 of FIG. 8 may be utilized to convey fluid from port 110 to port 112. Upon rotation of the flow control member 101 such that the passageways 105 align with the ports 110 and 111 or, alternatively, with the ports 111 and 112 then such ports are aligned respectively so that there is flow communication therebetween.

Figure 9:
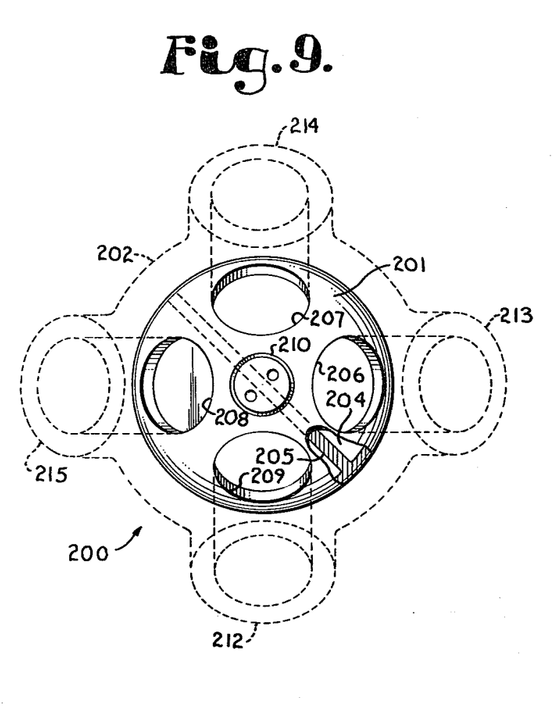
FIG. 9 is a second modified embodiment of a flow directing member according to the present invention having four passageways which are joined together in groups of two.

Illustrated in FIG. 9 is a second modified valve mechanism according to the present invention generally designated by the reference numeral 200. The valve mechanism 200 comprises a flow directing member 201 in a housing 202. The flow directing member 201 is generally shaped as a hemispherical sphere as was the flow directing member 50 of the first embodiment. However, the flow directing member 201 includes a floor 204 at the base of the hemisphere completely enclosing the bottom or open side of same. The member 201 also includes an interior partitioning wall 205 which extends parallel to and through an axis of the member 201 so as to divide same into quadrants. Passageways 206 and 207 are positioned in one of the quadrants and passageways 208 and 209 are positioned within the other quadrant so as to project through the hemispherical portion of the member 201. The passageways 206, 207, 208, and 209 are generally equal in size and positioned at 90 degree intervals with respect to the axis of the member 201. The member 201 has attached thereto and axially extending upward therefrom a shaft 210 for rotating same. The valve mechanism housing 202 is essentially the same as the housing 30 of the first embodiment except that same includes four ports 212, 213, 214, and 215 which are each equally spaced from the member axis and generally alignable with the member passageways. In the disclosed embodiment, the passageway 209 is aligned with port 212, passageway 208 is aligned with port 215, passageway 207 is aligned with port 214, and passageway 206 is aligned with port 213. In this manner, port 214 flow communicates with port 213 and port 212 flow communicates with port 215. Upon a 90 degree rotation of the flow directing member 201 in a clockwise direction port 212 would thereafter flow communicate with port 213 and port 215 would flow communicate with port 214. In this manner, members of two pairs of communicating conduits or processing lines may be switched so as to each communicate with a different member of the opposite pair, as in a four-way valve mechanism 200, and thereby provide an easily controllable valving mechanism having a very minimal flow restriction therethrough.

It is to be understood that while certain embodiments of this invention have been illustrated and described herein, it is not to be limited thereto except insofar as such limitations are included in the following claims.

What is claimed and desired to secure by Letters Patent is:

1. A valve arrangement comprising:
    (a) a housing outlet portion including a plurality of valve outlets, said outlet portion having an interior surface defining a valve chamber, said surface being a surface of revolution of a shape about an axis of said chamber, and said outlets being angularly spaced about said axis;
    (b) a flow directing member with an aperture therethrough rotatably mounted in said outlet portion to afford flow communication between said aperture and one of said outlets by alignment of said aperture with said outlet, said flow directing member having an external surface similar to said interior surface of said outlet portion so as to allow sliding therebetween when rotated relatively to each other about said axis, said flow directing member having a first annular bearing surface;
    (c) each of said outlets having a sealing ring slidable therein, said sealing ring having an annular sealing member on a first annular face thereof and having a second annular face in flow communication with said chamber whereby pressurized fluid within said chamber urges said sealing ring and said sealing member therewith into sealing contact with said exterior surface of said flow directing member;
    (d) a housing inlet portion sealingly attached to said housing outlet portion and having a second annular bearing surface slidably engaged by said first bearing surface of said flow directing member, said inlet portion having an inlet communicating with said aperture of said flow directing member; and
    (e) a stem connected to said flow directing member and extending through said housing outlet portion to allow selective rotation of said flow directing member about said axis to align said aperture with one of said outlets.

2. The arrangement according to claim 1 wherein:
    (a) said outlets of said housing outlet portion include a first outlet and a second outlet; and
    (b) said aperture of said flow directing member is a first aperture and said flow directing member includes a second aperture substantially similar to said first aperture, said first and second apertures being angularly spaced relative to one another and approximately equally spaced from said axis;
    (c) such that said inlet is always in flow communication with said first and second apertures.

3. The arrangement according to claim 2 including:
    (a) a first pressure relief vent and a second pressure relief vent in flow communication respectively with said first and second outlets;
    (b) a rupture disc installed in said first vent and operative to rupture at a selected pressure within said first vent to relieve an overpressure condition therein;

(c) a pressure relief device installed in said second vent and operating at a selected pressure to relieve an overpressure condition therein; and (d) said flow directing member normally being rotated to a first position to provide full flow communication between said first aperture and said first outlet and to completely seal said second outlet and upon said rupture disc rupturing said flow directing member being rotated to a second position to provide full flow communication between said second aperture and said second outlet and to completely seal said first outlet to allow replacement of said rupture disc.

4. The arrangement according to claim 3 including:
(a) motor means connected to said stem of said flow directing member;
(b) a sensor for detecting the rupture of said rupture disc and for providing a rupture signal in response thereto; and
(c) automatic control means communicating with said motor means and said sensor and operative in response to said rupture signal to cause said motor means to rotate said flow directing member from said first position to said second position.

5. The arrangement according to claim 3 wherein:
(a) said first and second outlets and said first and second apertures are sized and positioned such that said second aperture is partially aligned with said second outlet when said first aperture is partially aligned with said first outlet whereby said inlet is always in flow communication with at least one of said outlets.

6. The arrangement according to claim 5 wherein:
(a) said first and second outlets are positioned at 180 degrees relative to said axis; and
(b) said first and second apertures are positioned at 90 degrees relative to said axis.

7. The arrangement according to claim 6 including:
(a) stop means associated with said flow directing member and restricting rotation thereof to a range including and between said first and second positions.

8. The arrangement according to claim 2 including:
(a) a first pressure relief vent and a second pressure relief vent in flow communication respectively with said first and second outlets;
(b) a disc cartridge receptacle installed in each of said pressure relief vents;
(c) a rupture disc cartridge manually removably received in each of said receptacles, each cartridge having a pressure relief rupture disc positioned therein to block flow through the vent associated therewith until a selected overpressure condition acts thereon whereupon said disc ruptures to relieve said condition; and
(d) said flow directing member normally being rotated to a first position to provide full flow communication between said first aperture and said first outlet and, upon the rupture disc in said first vent rupturing, said flow directing member being rotated to a second position to provide full flow communication between said second aperture and said second outlet to allow manual removal of the cartridge from the receptacle in said first vent and replacement thereof.

9. The arrangement according to claim 1 wherein:
(a) said flow directing member is a relatively thin walled, substantially hemispherical shell.

10. A valve arrangement comprising:
(a) a housing outlet portion including a first outlet and a second outlet, said outlet portion having a substantially spherical interior surface defining a valve chamber, said chamber having an axis;
(b) a flow directing member rotatably mounted in said chamber, said flow directing member being a relatively thin walled, substantially hemispherical shell with an external surface generally mating with said outlet interior surface and having a first aperture and a second aperture therethrough, said apertures being alignable respectively with said outlets, said flow directing member terminating in a first annular bearing surface;
(c) each of said outlets having a sealing ring slidable therein, said sealing ring having an annular sealing member on a first annular face thereof and having a second annular face in flow communication with said chamber whereby pressurized fluid within said chamber urges said sealing ring and said sealing member therewith into sealing contact with said exterior surface of said flow directing member;
(d) a housing inlet portion sealingly attached to said housing outlet portion and having a second annular bearing surface slidably engaged by said first bearing surface of said flow directing member, said inlet portion having an inlet communicating with said apertures and communicating with one of said outlets upon the respective aperture being aligned with said outlet;
(e) a first pressure relief vent and a second pressure relief vent in flow communication respectively with said first and second outlets;
(f) a disc cartridge receptacle installed in each of said pressure relief vents;
(g) a rupture disc cartridge manually removably received in each of said receptacles, each cartridge having a pressure relief rupture disc positioned therein to block flow through the vent associated therewith until a selected overpressure condition acts thereon;
(h) said second outlet being completely sealed by said flow directing member in a first position thereof wherein said first aperture is fully aligned with said first outlet, said first outlet being completely sealed by said flow directing member in a second position thereof wherein said second aperture is fully aligned with said second outlet, and said first and second outlets and said first and second apertures being sized and positioned such that said second aperture is partially aligned with said second outlet when said first aperture is partially aligned with said first outlet whereby said inlet is always in substantial flow communication with at least one of the rupture discs, said flow directing member normally being in said first position;
(i) stop means associated with said flow directing member and restricting rotation thereof to a range including and between said first and second positions;
(j) motor means connected to said flow directing member and operative to rotate same;
(k) a rupture sensor associated with each of said rupture discs for detecting the rupture respectively thereof and for providing a rupture signal in response thereto; and
(l) automatic control means communicating with said motor means and the rupture sensors and operative in response to said rupture signal to cause said motor means to rotate said flow directing member from said first position to said second position to allow removal and replacement of the ruptured disc.

11. In a valve arrangement, the combination comprising:
   (a) a valve housing having a first outlet and a second outlet in angularly spaced relation about a first axis of said housing and having an inlet, said housing including an inner surface which is a surface of revolution of a shape about said first axis;
   (b) a flow directing member having a first aperture and a second aperture therethrough, said first and second apertures being in angularly spaced relation about a second axis associated with said member and in flow communication with said inlet, said flow directing member having an outer surface similar to said inner surface of said housing;
   (c) said flow directing member being rotatably mounted coaxially within said housing for sealing between the outer surface of said flow directing member with the inner surface of said housing, said flow directing member being rotatable to selectively position one of said first and second apertures in alignment with a respective one of said first and second outlets to provide full communication therethrough and to completely seal the other of said outlets; and
   (d) said outlets and said apertures being sized and positioned such that said second aperture is partially aligned with said second outlet when said first aperture is partially aligned with said first outlet whereby a flow path is always provided between said inlet and at least one of said outlets.

12. A combination according to claim 11 wherein:
   (a) said outlets are positioned at 180° about said first axis; and
   (b) said apertures are positioned at 90° about said second axis.

13. A combination according to claim 11 including:
   (a) a first pressure relief vent and a second pressure relief vent in flow communication respectively with said first and second outlets;
   (b) a rupture disc installed in said first vent and operative to rupture at a selected pressure within said first vent to relieve an overpressure condition therein; and
   (c) a pressure relief device installed in said second vent and operating at a selected pressure to relieve an overpressure condition therein.

14. A combination according to claim 11 including:
   (a) a first pressure relief vent and a second pressure relief vent in flow communication respectively with said first and second outlets;
   (b) a disc cartridge receptacle installed in each of said pressure relief vents; and
   (c) a rupture disc cartridge manually removably received in each of said receptacles, each cartridge having a pressure relief rupture disc positioned therein to block flow through the vent associated therewith until a selected overpressure condition acts thereon whereupon said disc ruptures to relieve said condition.

15. A combination according to claim 11 wherein:
   (a) said flow directing member is a relatively thin walled, substantially hemispherical shell; and
   (b) said inner surface of said housing is of a similar shape.

* * * * *